(12) United States Patent
Zocher et al.

(10) Patent No.: US 11,824,458 B2
(45) Date of Patent: Nov. 21, 2023

(54) DC-TO-DC CONVERTER AND OPERATION THEREOF

(71) Applicant: Siemens Aktiengesellschaft, Munich (DE)

(72) Inventors: Markus Zocher, Wolframs-Eschenbach (DE); Martin Hergt, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 145 days.

(21) Appl. No.: 17/260,174

(22) PCT Filed: Jul. 15, 2019

(86) PCT No.: PCT/EP2019/068997
§ 371 (c)(1),
(2) Date: Jan. 13, 2021

(87) PCT Pub. No.: WO2020/020685
PCT Pub. Date: Jan. 30, 2020

(65) Prior Publication Data
US 2021/0297000 A1     Sep. 23, 2021

(30) Foreign Application Priority Data

Jul. 23, 2018   (EP) ..................... 18184944

(51) Int. Cl.
*H02M 3/335* (2006.01)
*H02M 1/00* (2006.01)
*H02M 3/00* (2006.01)

(52) U.S. Cl.
CPC ...... *H02M 3/33584* (2013.01); *H02M 1/0058* (2021.05); *H02M 3/01* (2021.05); *H02M 3/33571* (2021.05)

(58) Field of Classification Search
CPC ........... H02M 1/0058; H02M 3/33571; H02M 3/33573; H02M 3/33584; H02M 3/33592
See application file for complete search history.

(56) References Cited

U.S. PATENT DOCUMENTS

| 2011/0007528 A1* | 1/2011 | Scheel | ............ H05G 1/10 363/21.03 |
| 2015/0295503 A1* | 10/2015 | Muto | ............ H02M 3/33584 363/17 |

FOREIGN PATENT DOCUMENTS

| FR | 3 050 593 A1 | 10/2017 | |
| JP | 2013027201 A | 2/2013 | |
| WO | WO-2017187045 A1 * | 11/2017 | ........ H02M 3/33569 |

OTHER PUBLICATIONS

Machine translation of WO-2017/187045-A1. Obtained from USPTO search databases. (Year: 2017).*

(Continued)

*Primary Examiner* — Fred E Finch, III
(74) *Attorney, Agent, or Firm* — Henry M. Feiereisen LLC

(57) ABSTRACT

A DC-to-DC converter converts a DC input voltage to a DC output voltage by generating a primary AC voltage and transforming the primary AC voltage into a secondary AC voltage with a transformation ratio. The DC-to-DC converter has series resonance circuit for each AC voltage phase. When the ratio of the DC output voltage to the DC input direct voltage is greater than the transformation ratio, a phase shift between the primary alternating voltage and a series resonance circuit current corresponding to the primary alternating voltage is controlled to zero by changing a clocking frequency clocking the AC voltages. Conversely, when the ratio of the DC output voltage to the DC input voltage is less than the transformation ratio, the phase shift between the secondary AC voltage and a series resonance (Continued)

circuit current corresponding to the secondary AC voltage is controlled to zero by changing a clocking frequency.

9 Claims, 4 Drawing Sheets

(56) References Cited

OTHER PUBLICATIONS

Xiaoding, Li et al: "Analysis and Design of High-Frequency Isolated Dual-Bridge Serires Resonant DC/DC Converter" IEEE Transactions on Power Electronics, USA vol. 25, No. 4, Apr. 1, 2010 (Apr. 1, 2010), pp. 850-862, XP055455666, ISSN: 0885-8993 DOI: 10.1109/TPEL.2009.2034662.

Segaran Dinesh et al: "Comparative analysis of single and three-phase dual active bridge bidirectional DC-DC converters", Universities Power Engineering Conference, 2008. AUPEC '08. Australasian, IEEE, Piscataway, NJ, USA, pp. 1-6, XP031448299, ISBN: 978-0-7334-2715-2; pp. 1-2; 2008.

Huang Qicheng et al: "A bi-directional resonant DC/DC converter with frequency tracking control", 2014 IEEE Energy Conversion Congress and Exposition (ECCE), IEEE, pp. 4748-4754, XP032681139, DOI: 10.1109/ECCE.2014.6954051, [gefunden am Nov. 11, 2014], the whole document: Table 1; 2014.

PCT International Search Report and Written Opinion of International Searching Authority dated Oct. 22, 2019 corresponding to PCT International Application No. PCT/EP2019/068997 filed Jul. 15, 2019.

\* cited by examiner

DC-TO-DC CONVERTER AND OPERATION THEREOF

CROSS-REFERENCES TO RELATED APPLICATIONS

This application is the U.S. National Stage of International Application No. PCT/EP2019/068997, filed Jul. 15, 2019, which designated the United States and has been published as International Publication No. WO 2020/020685 A1 and which claims the priority of European Patent Application, Serial No. 18184944.9, filed Jul. 23, 2018, pursuant to 35 U.S.C. 119(a)-(d).

BACKGROUND OF THE INVENTION

The invention relates to a DC-to-DC converter having a dual active bridge topology and a series resonant circuit for each AC voltage phase, and to a method for operating such a DC-to-DC converter.

A DC-to-DC converter having a dual active bridge topology comprises two converter units, each having a plurality of semiconductor switches, and a transformer unit connected between the two converter units. From a DC input voltage, one converter unit generates a primary AC voltage which is transformed into a secondary AC voltage by the transformer unit. The other converter unit produces a DC output voltage from the secondary AC voltage. The AC voltages can be single-phase or multi-phase and are clocked at a clock frequency which is used to drive the semiconductor switches. The invention relates to a DC-to-DC converter implemented in dual active bridge topology and having a series resonant circuit comprising at least one capacitor and at least one inductor for each AC voltage phase. The power or the DC output voltage of such a DC-to-DC converter is usually controlled by changing a phase shift between the primary and the secondary AC voltage. The efficiency of the DC-to-DC converter depends on the ratio of the DC output voltage to the DC input voltage. The efficiency is optimum when this ratio is the same as or only slightly at variance with the transformation ratio of the transformer unit. The efficiency decreases the further this ratio deviates from the transformation ratio of the transformer unit.

FR 3 050 593 A1 discloses a method and a system for controlling a DC-to-DC converter having a dual bridge topology, comprising two converters for converting a first DC voltage into a second DC voltage. An optimum phase shift angle between two AC voltages that are generated to convert the first DC voltage into the second DC voltage is determined.

The object of the invention is to optimize the efficiency of a DC-to-DC converter having a dual active bridge topology and a series resonant circuit for each AC voltage phase.

SUMMARY OF THE INVENTION

This object is achieved according to the invention by a method as set forth hereinafter, and by a DC-to-DC converter as set forth hereinafter.

Advantageous embodiments of the invention are set forth in the subclaims.

The method according to the invention relates to the operation of a DC-to-DC converter for generating a multi-phase primary AC voltage from a DC input voltage, transforming the primary AC voltage into a secondary AC voltage with a transformation ratio and generating a DC output voltage from the secondary AC voltage, wherein the DC-to-DC converter has a dual active bridge topology with a series resonant circuit for each AC voltage phase. According to the invention, a phase shift between the primary AC voltage and a series resonant circuit current corresponding thereto is controlled to zero by changing a clock frequency clocking the AC voltages when the ratio of the DC output voltage to the DC input voltage is greater than the transformation ratio, and a phase shift between the secondary AC voltage and a corresponding series resonant circuit current is controlled to zero by changing the clock frequency when the ratio of the DC output voltage to the DC input voltage is less than the transformation ratio.

The basic concept of the invention is to control to zero the phase shift between the primary or secondary AC voltage of the DC-to-DC converter and a corresponding series resonant circuit current by changing the clock frequency of the AC voltage. Whether the phase shift between the primary or secondary AC voltage and the series resonant circuit current is controlled to zero depends on whether the ratio of the DC output voltage to the DC input voltage is greater or less than the transformation ratio of the transformer unit. On the one hand, this control action reduces the conductive losses, since the reactive power flowing into a series resonant circuit from the primary or secondary side is reduced. In addition, switching losses during switching of the voltage bridges are significantly reduced, since a primary or secondary voltage bridge is switched precisely when the current through the corresponding series resonant circuit is zero or at least almost zero (so-called zero current switching). Without such control of the phase shift between the primary or secondary AC voltage and the series resonant circuit current, larger deviations of the ratio of the DC output voltage to the DC input voltage from the transformer ratio of the transformer unit would result in phase shifts between the primary or secondary AC voltage and the series resonant circuit current which increase the conductive losses and switching losses and reduce the efficiency of the DC-to-DC converter.

As the phase shift between the primary or secondary AC voltage and a corresponding series resonant circuit current, the average value of phase shifts between an AC voltage phase and the current flowing through the series resonant circuit of that AC voltage phase is controlled in each case. Thus an average value of phase shifts between an AC voltage phase of the primary AC voltage and the current flowing through the series resonant circuit of that AC voltage phase is controlled to zero in each case if the ratio of the DC output voltage to the DC input voltage is greater than the transformation ratio, and an average value of phase shifts between an AC voltage phase of the secondary AC voltage and the current flowing through the series resonant circuit of this AC voltage phase is controlled to zero in each case if the ratio of the DC output voltage to the DC input voltage is less than the transformation ratio. Average values of phase shifts between an AC voltage phase of the primary or secondary AC voltage and the corresponding series resonant circuit current are therefore determined and controlled to zero in each case. As a result, measurement inaccuracies in determining the individual phase shifts and small fluctuations in the phase relationships between the different AC phases can be advantageously compensated.

An embodiment of the invention provides that, by changing a phase shift between the primary AC voltage and the secondary AC voltage, a power transmitted by the DC-to-DC converter is controlled to a power setpoint value or the DC output voltage is controlled to a voltage setpoint. This embodiment of the invention provides two-variable control of the DC-to-DC converter, whereby, in addition to the clock frequency, the phase shift between the primary AC voltage and the secondary AC voltage is also changed. This allows the power or the DC output voltage of the DC-to-DC converter to be controlled with optimized efficiency. A phase shift between the primary AC voltage and the secondary AC voltage is understood as being a phase shift between an AC voltage phase of the primary AC voltage and a corresponding AC voltage phase of the secondary AC voltage or an average value of phase shifts between an AC voltage phase of the primary AC voltage and a corresponding AC voltage phase of the secondary AC voltage.

A DC-to-DC converter according to the invention for generating a multi-phase primary AC voltage from a DC input voltage, transforming the primary AC voltage into a secondary AC voltage with a transformation ratio and generating a DC output voltage from the secondary AC voltage comprises for each AC voltage phase a primary-side voltage bridge having a plurality of semiconductor switches for generating the primary AC voltage from the DC input voltage, a transformer unit for transforming the primary AC voltage into the secondary AC voltage, for each AC voltage phase a secondary-side voltage bridge having a plurality of semiconductor switches for generating the DC output voltage from the secondary AC voltage, for each AC voltage phase a series resonant circuit and a measuring device arrangement. The measuring device arrangement is designed to detect the DC input voltage, the DC output voltage and variations over time of a plurality of AC voltage phases of the primary AC voltage, the corresponding AC voltage phases of the secondary AC voltage and the currents flowing through the series resonant circuits of these AC voltage phases. The DC-to-DC converter also comprises a control unit which is designed to control to zero an average value of the phase shifts between one of these AC voltage phases of the primary AC voltage in each case and the current flowing through the series resonant circuit of this AC voltage phase by changing a clock frequency clocking the AC voltages if the ratio of the DC output voltage to the DC input voltage is greater than the transformation ratio, and to control to zero an average value of the phase shifts between one of said AC voltage phases of said secondary AC voltage in each case and the current flowing through the series resonant circuit of said AC voltage phase by changing the clock frequency if the ratio of the DC output voltage to the DC input voltage is less than the transformation ratio.

A DC-to-DC converter according to the invention enables the method according to the invention to be carried out. The advantages of a DC-to-DC converter according to the invention correspond to the above-mentioned advantages of the method according to the invention and will not be reiterated here.

In an embodiment of a DC-to-DC converter according to the invention, each primary-side voltage bridge is a half-bridge whose bridge arms each contain a semiconductor switch and whose bridge branch is connected to a primary winding of the transformer unit, and each secondary-side voltage bridge is a half-bridge whose bridge arms each contain a semiconductor switch and whose bridge branch is connected to a secondary winding of the transformer unit. Voltage bridges designed as half bridges reduce the number of semiconductor switches and thus the space requirement and material costs for the voltage bridges compared to full bridges.

In another embodiment of a DC-to-DC converter according to the invention, the transformer unit is designed as a multi-phase transformer or has a transformer for each AC voltage phase. Implementing the transformer unit as a multi-phase transformer simplifies the design of the DC-to-DC converter compared to implementation using individual transformers, which is also possible.

In another embodiment of a DC-to-DC converter according to the invention, the control unit has at least one first phase detector for determining a phase shift between an AC voltage phase of the primary AC voltage and the current flowing through the series resonant circuit of that AC voltage phase, and a second phase detector for determining a phase shift between an AC voltage phase of the secondary AC voltage and the current flowing through the series resonant circuit of that AC voltage phase. The use of different phase detectors for AC voltage phases of the primary and secondary AC voltages advantageously makes it possible to quickly switch between detecting a phase shift between a primary AC voltage phase and the corresponding series resonant circuit current and detecting a phase shift between a secondary AC voltage phase and the corresponding series resonant circuit current when the ratio of the DC output voltage to the DC input voltage changes.

In another embodiment of a DC-to-DC converter according to the invention, the control unit is designed to control a power transmitted by the DC-to-DC converter to a power setpoint value or the DC output voltage to a voltage setpoint by changing a phase shift between the primary AC voltage and the secondary AC voltage.

In another embodiment of a DC-to-DC converter according to the invention, each series resonant circuit is disposed on the secondary side or the primary side of the transformer unit or the components of each series resonant circuit are distributed between the secondary side and the primary side of the transformer unit. The design of the series resonant circuits and the distribution of the components of the series resonant circuits between the secondary side and the primary side of the transformer unit is irrelevant to the invention, i.e. the invention is advantageously applicable to different series resonant circuit designs, since the transformer unit essentially only produces a change in impedance for the currents of the series resonant circuits.

BRIEF DESCRIPTION OF THE DRAWING

The above-described properties, features and advantages of this invention as well as the manner in which they are achieved will become clearer and more readily understandable in conjunction with the following description of exemplary embodiments which will be explained in more detail with reference to the accompanying drawings in which.

DETAILED DESCRIPTION OF PREFERRED EMBODIMENTS

Figure 1:
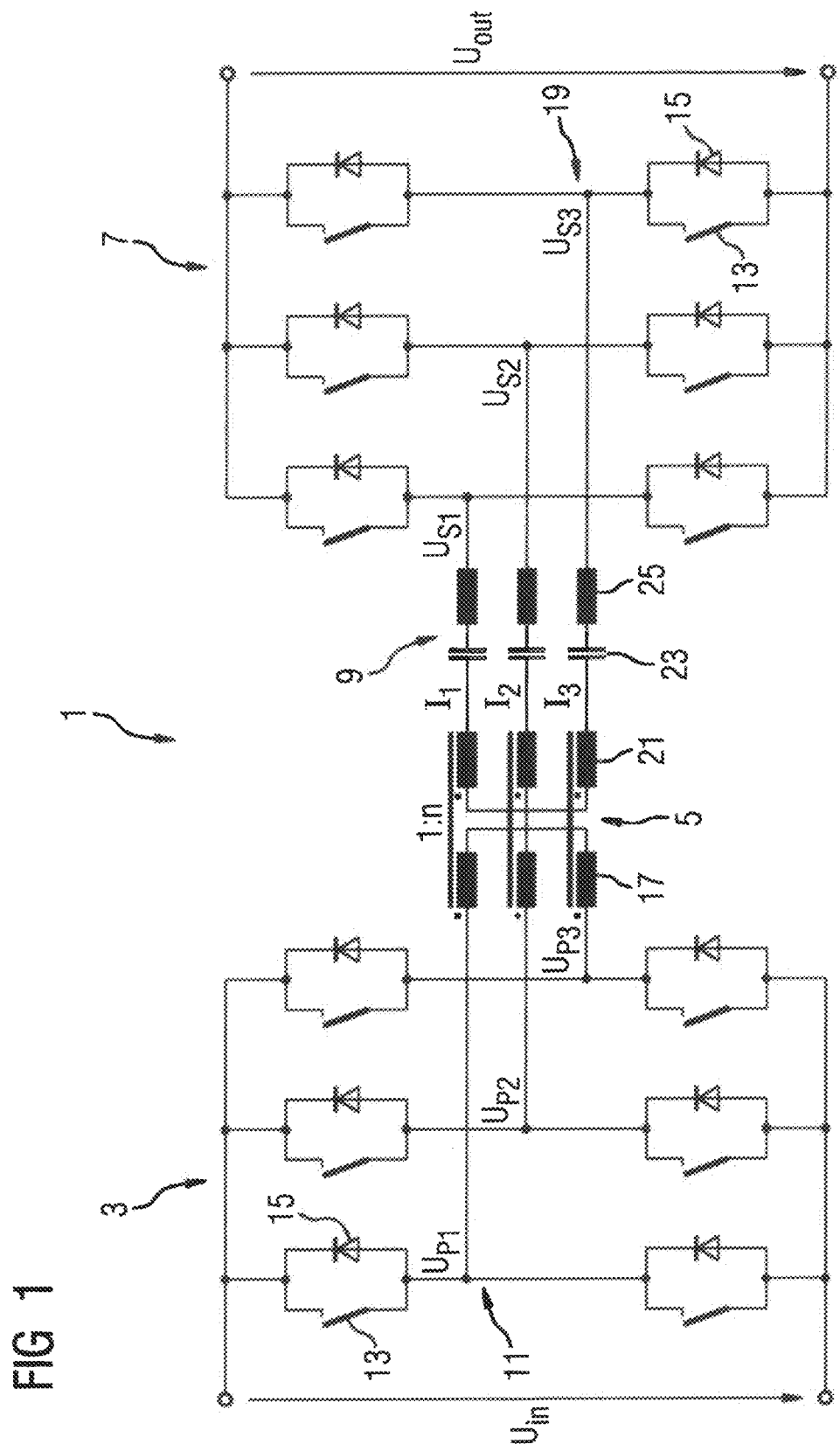
FIG. 1 shows a circuit diagram of a three-phase DC-to-DC converter having a dual active bridge topology and a series resonant circuit for each AC voltage phase.

Mutually corresponding parts are provided with the same reference characters in the figures.

FIG. 1 shows a circuit diagram of a three-phase DC-to-DC converter 1 for converting a DC input voltage $U_{in}$ into a DC output voltage $U_{out}$. The DC-to-DC converter 1 comprises a first converter unit 3 for generating a primary AC voltage from the DC input voltage $U_{in}$, a transformer unit 5 for transforming the primary AC voltage into a secondary AC voltage, a second converter unit 7 for generating the DC output voltage $U_{out}$ from the secondary AC voltage, and a series resonant circuit 9 for each AC voltage phase.

The DC-to-DC converter 1 has a dual active bridge topology. The first converter unit 3 has a primary-side voltage bridge 11 for each AC voltage phase $U_{P1}$, $U_{P2}$, $U_{P3}$ of the primary AC voltage. Each primary-side voltage bridge 11 is designed as a half-bridge whose bridge arms contain a semiconductor switch 13 and a free-wheeling diode 15 connected in parallel with the semiconductor switch 13 in each case, and whose bridge branch is connected to a primary winding 17 of transformer unit 5.

The second transformer unit 5 has a secondary-side voltage bridge 19 for each AC voltage phase $U_{S1}$, $U_{S2}$, $U_{S3}$ of the secondary AC voltage. Each secondary-side voltage bridge 19 is designed as a half-bridge whose bridge arms each contain a semiconductor switch 13 and a free-wheeling diode 15 connected in parallel with the semiconductor switch 13 in each case, and whose bridge branch is connected via a series resonant circuit 9 to a secondary winding 21 of the transformer unit 5.

Each series resonant circuit 9 has a capacitor 23 and an inductor 25 connected in series.

The transformer unit 5 is designed as a three-phase transformer.

Figure 2:
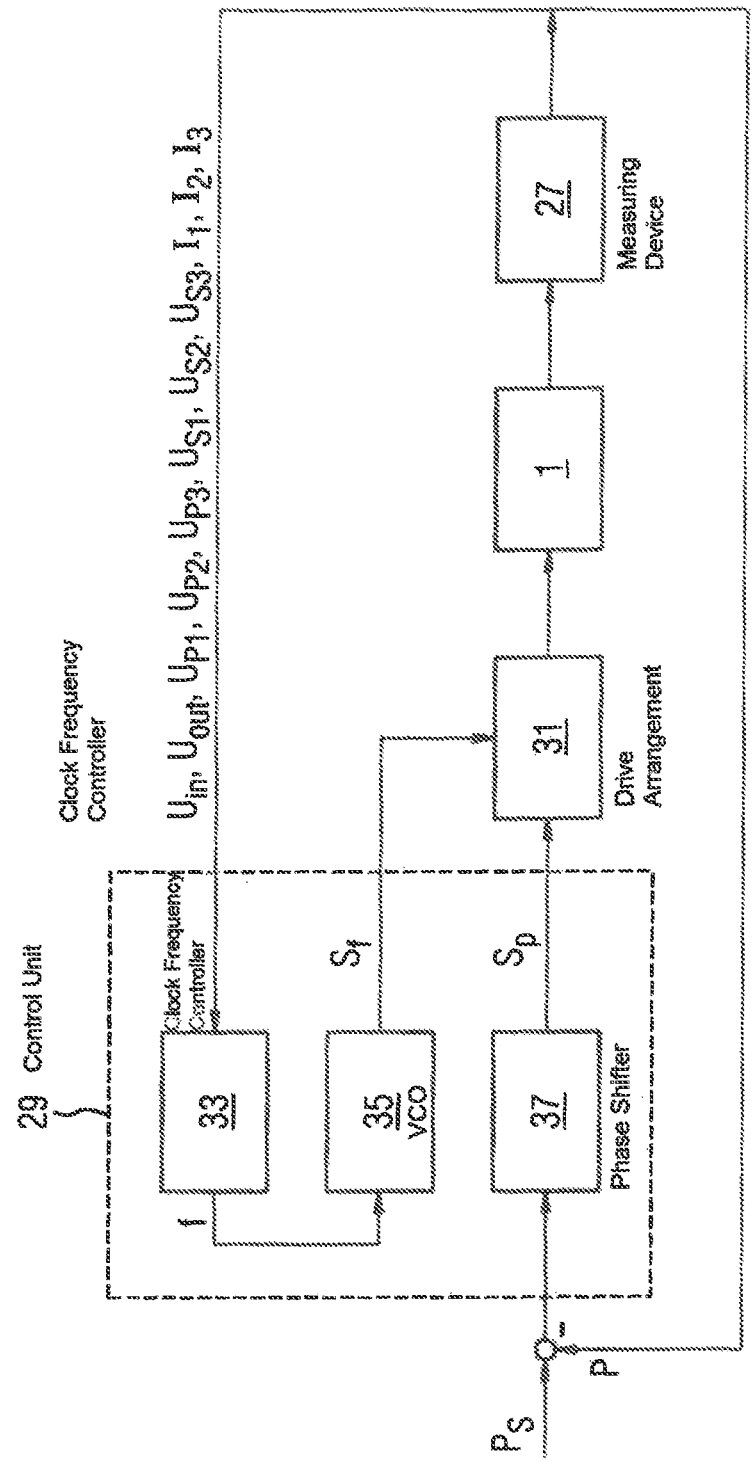
FIG. 2 shows a control loop for controlling a DC-to-DC converter.

The DC-to-DC converter 1 also has a measuring device arrangement 27 and a control unit 29 which are not shown in FIG. 1 (see FIG. 2). The measuring device arrangement 27 has measuring devices for detecting the DC input voltage $U_{in}$, the DC output voltage $U_{out}$, a power P transmitted by the DC-to-DC converter 1, and variations over time of the AC voltage phases $U_{P1}$, $U_{P2}$, $U_{P3}$ of the primary AC voltage, of the AC voltage phases $U_{S1}$, $U_{S2}$, $U_{S3}$ of the secondary AC voltage, and of the currents $I_1$, $I_2$, $I_3$ flowing through the series resonant circuits 9.

The control unit 29 is designed to control to zero an average value of phase shifts between an AC voltage phase $U_{P1}$, $U_{P2}$, $U_{P3}$ of the primary AC voltage and the respective current $I_1$, $I_2$, $I_3$ flowing through the series resonant circuit 9 of that AC voltage phase $U_{P1}$, $U_{P2}$, $U_{P3}$ by changing a clock frequency f clocking the AC voltages if the ratio of the DC output voltage $U_{out}$ to the DC input voltage $U_{in}$ is greater than the transformation ratio n of the transformer unit 5, and to control to zero an average value of phase shifts between an AC voltage phase $U_{S1}$, $U_{S2}$, $U_{S3}$ of the secondary AC voltage and the respective current $I_1$, $I_2$, $I_3$ flowing through the series resonant circuit 9 of said AC voltage phase $U_{S1}$, $U_{S2}$, $U_{S3}$ if the ratio of the DC output voltage $U_{out}$ to the DC input voltage $U_{in}$ is less than the transformation ratio n.

The control unit 29 is also designed to control the power P transmitted by the DC-to-DC converter 1 to a power setpoint value $P_S$ by changing a phase shift between the primary AC voltage and the secondary AC voltage.

FIG. 2 shows a control loop for operating the DC-to-DC converter 1 shown in FIG. 1 in accordance with the inventive method. The control loop comprises the control unit 29, a drive arrangement 31 for driving the semiconductor switches 13, the DC-to-DC converter 1 and the measuring device arrangement 27.

The control unit 29 comprises a clock frequency controller 33, a voltage-controlled oscillator (VCO) 35, and a phase shift controller 37.

The measuring device arrangement 27 detects the DC input voltage $U_{in}$, the DC output voltage $U_{out}$, the power P transmitted by the DC-to-DC converter 1 and variations over time of the AC voltage phases $U_{P1}$, $U_{P2}$, $U_{P3}$ of the primary AC voltage, the AC voltage phases $U_{S1}$, $U_{S2}$, $U_{S3}$ of the secondary AC voltage and the currents $I_1$, $I_2$, $I_3$ flowing through the series resonant circuits 9.

The DC input voltage $U_{in}$, the DC output voltage $U_{out}$ and the variations over time of the AC voltage phases $U_{P1}$, $U_{P2}$, $U_{P3}$ of the primary AC voltage, the AC voltage phases $U_{S1}$, $U_{S2}$, $U_{S3}$ of the secondary AC voltage and the currents $I_1$, $I_2$, $I_3$ flowing through the series resonant circuits 9 are transmitted to the clock frequency controller 33 by the measuring device arrangement 27. The clock frequency controller 33 determines the clock frequency f in the manner described in greater detail below with reference to FIG. 3 and transmits it to the voltage-controlled oscillator 35.

The voltage-controlled oscillator 35 generates a square wave voltage of the clock frequency f which is used as a clock signal $S_f$ for the drive arrangement 31.

Any deviation, determined by the measuring device arrangement 27, of the power P of the DC-to-DC converter 1 from the power setpoint value $P_S$ is transmitted to the phase shift controller 37. The phase shift controller 37 transmits to the drive arrangement 31 a phase shift signal $S_P$ by which the power P is controlled to the power setpoint value $P_S$ by changing the phase shift between the primary AC voltage and the secondary AC voltage. The phase shift controller 37 is designed as a PI controller, for example.

The drive arrangement 31 drives the semiconductor switches 13 of the DC-to-DC converter 1. For example, each semiconductor switch 13 is an insulated-gate bipolar transistor (IGBT) or a metal-oxide-semiconductor field-effect transistor (MOSFET) and the drive arrangement 31 has, for each semiconductor switch 13, a gate driver to which the clock signal $S_f$ and the phase shift signal $S_P$ are fed.

Figure 3:
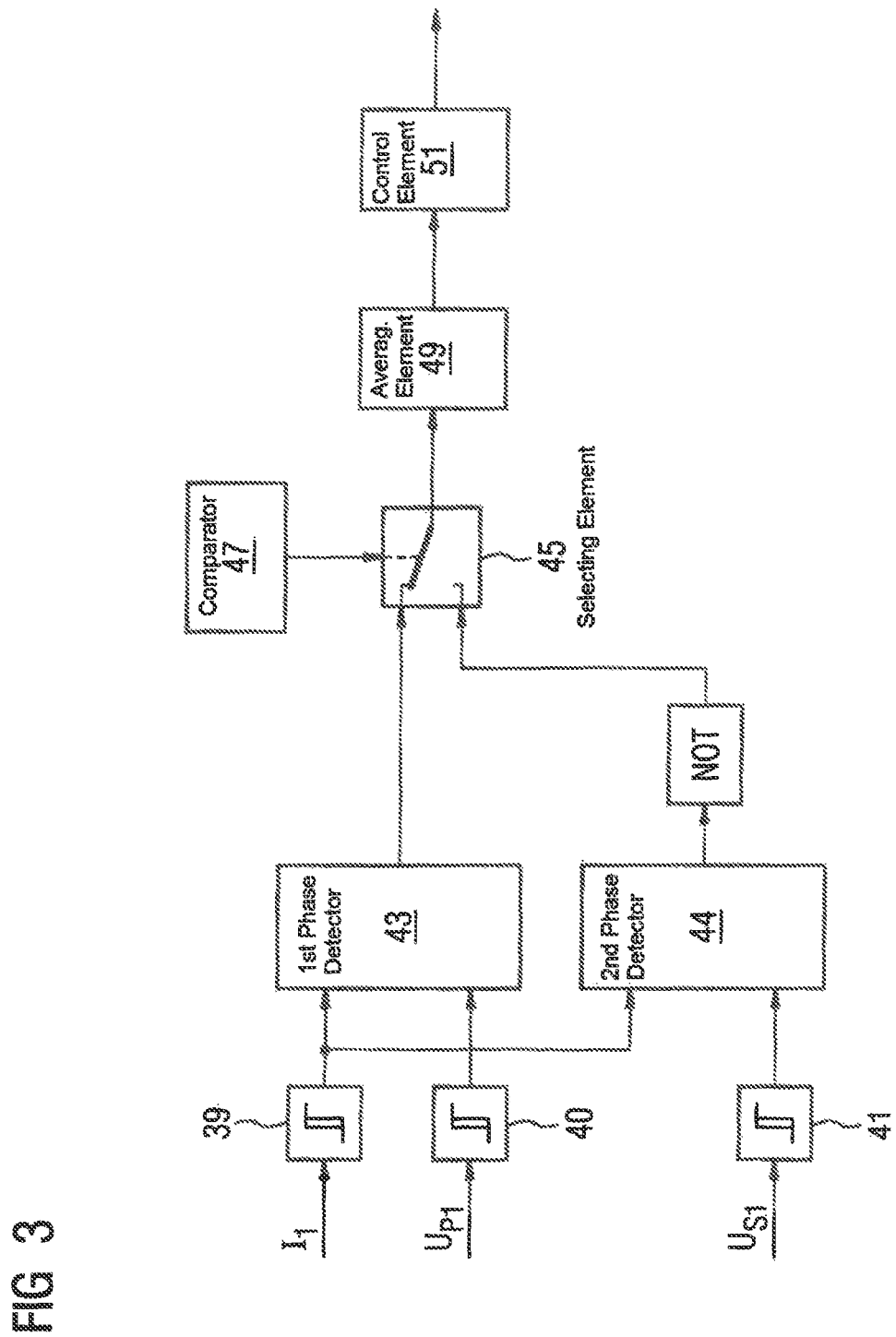
FIG. 3 shows a block diagram of a clock frequency controller for controlling a clock frequency of a DC-to-DC converter.

FIG. 3 shows a block diagram of the clock frequency controller 33, wherein, by way of example, the evaluation of a primary AC voltage phase $U_{P1}$, the corresponding secondary AC voltage phase $U_{S1}$ and the current $I_1$ through the corresponding series resonant circuit 9 is shown. For each of these variables $U_{P1}$, $U_{S1}$, $I_1$, a digital sign signal which indicates an instantaneous sign of the variable $U_{P1}$, $U_{S1}$, $I_1$ is continuously determined using a digitizing element 39 to 41. Each digitizing element 39 to 41 is designed as a Schmitt trigger, for example.

The sign signals determined for the primary AC voltage phase $U_{P1}$ and the current $I_1$ are fed to a first digital phase detector 43 which determines therefrom a phase shift between the primary AC voltage phase $U_{P1}$ and the current $I_1$.

The sign signals determined for the secondary AC voltage phase $U_{S1}$ and the current $I_1$ are fed to a second digital phase detector 44 which determines therefrom a phase shift between the secondary AC voltage phase $U_{S1}$ and the current $I_1$.

The phase detectors 43, 44 typically each have an EXOR gate.

The output signal of the first phase detector 43 and the inverted output signal of the second phase detector 44 are fed to a selecting element 45 which is controlled by a comparing element 47. The comparing element 47 determines a ratio $U_{out}/U_{in}$ of the DC output voltage $U_{out}$ to the DC input voltage $U_{in}$ and compares the ratio with the transformation ratio n. If the ratio $U_{out}/U_{in}$ is greater than the transformation ratio n, the output signal of the first phase detector 43 is fed from the selecting element 45 to an averaging element 49. If the ratio $U_{out}/U_{in}$ is less than the transformation ratio n, the selecting element 45 forwards the inverted output signal of the second phase detector 44 to the averaging element 49. The output signal of the second phase detector 44 is inverted in order to change the clock frequency f in the event that $U_{out}/U_{in}$<n, in a direction other than in the event that $U_{out}/U_{in}$>n.

Accordingly, the other two primary AC voltage phases $U_{P2}$, $U_{P3}$, the corresponding secondary AC voltage phases $U_{S2}$, $U_{S3}$ and currents $I_2$, $I_3$ are evaluated by the corresponding series resonant circuits 9, so that for each AC voltage phase of the DC-to-DC converter 1 the phase shift between the primary AC voltage phase $U_{P1}$, $U_{P2}$, $U_{P3}$ and the current $I_1$, $I_2$, $I_3$ through the corresponding series resonant circuit 9 is fed to the averaging element 49 if the ratio $U_{out}/U_{in}$ is greater than the transformation ratio n, and the phase shift between the secondary AC voltage phase $U_{S1}$, $U_{S2}$, $U_{S3}$ and the current $I_1$, $I_2$, $I_3$ through the corresponding series resonant circuit 9 is fed as an inverted signal if the ratio $U_{out}/U_{in}$ is less than the transformation ratio n.

The averaging element 49 has a low-pass filter for filtering the signals fed to it, and calculates an average value from the filtered signals which it outputs to a control element 51.

From the signal fed to it by the averaging element 49, the control element 51 determines the clock frequency f for driving the semiconductor switches 13. The control element 51 is designed as a PI controller, for example.

Figure 4:
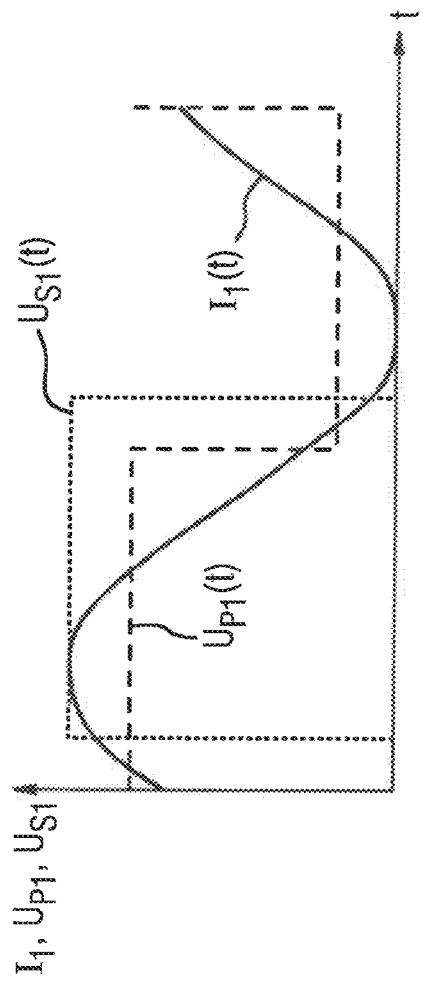
FIG. 4 shows variations over time of an AC voltage phase of a primary AC voltage, the corresponding AC voltage phase of a secondary AC voltage and the current flowing through a series resonant circuit of that AC voltage phase without changing of the clock frequency of the AC voltage.
Figure 5:
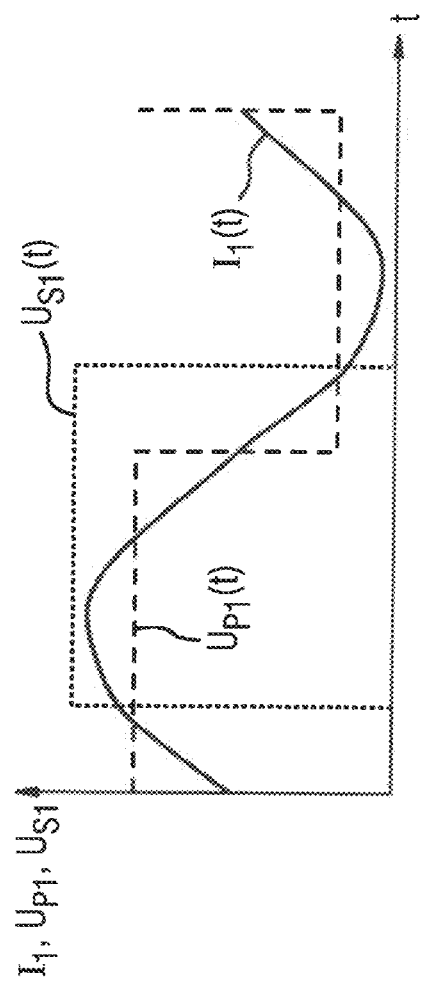
FIG. 5 shows variations over time of an AC voltage phase of a primary AC voltage, the corresponding AC voltage phase of a secondary AC voltage and the current flowing through a series resonant circuit of this AC voltage phase with a change in the clock frequency of the AC voltage.

FIGS. 4 and 5 illustrate the effect of the invention on variations, as a function of time t, of a primary AC voltage phase $U_{P1}$, the corresponding secondary AC voltage phase $U_{S1}$ and the current $I_1$ through the corresponding series resonant circuit 9 in the case that the ratio $U_{out}/U_{in}$ is greater than the transformation ratio n.

FIG. 4 shows the waveforms without the clock frequency f being changed. The current $I_1$ through the series resonant circuit 9 leads the primary AC voltage phase $U_{P1}$ and the secondary AC voltage phase $U_{S1}$. This results in an increase in the conductive losses because reactive power flows into the series resonant circuit 9 from the primary side and from the secondary side. In addition, high switching losses occur in the primary-side voltage bridge 11 of the primary AC voltage phase $U_{P1}$ and the secondary-side voltage bridge 19 of the secondary AC voltage phase $U_{S1}$ because the instantaneous value of the current $I_1$ is relatively high whenever when the sign of an AC voltage phase $U_{P1}$, $U_{S1}$ changes.

FIG. 5 shows the waveforms with inventive controlling to zero of the phase shift between $U_{P1}$ and $I_1$ by changing the dock frequency f. The control action reduces the conductive losses of the primary-side voltage bridge 11 of the primary AC voltage phase $U_{P1}$ compared to the situation shown in FIG. 4, since no reactive power flows from that voltage bridge 11 into the corresponding series resonant circuit 9. Moreover, the switching losses are significantly reduced, since said primary-side voltage bridge 11 is switched precisely when the current $I_1$ is zero (so-called zero current switching). The efficiency is improved as a result. Although the secondary-side voltage bridge 19 of the secondary AC voltage phase $U_{S1}$ still causes some power loss, this loss is lower compared to the situation shown in FIG. 4 because the maximum value of the current $I_1$ and the instantaneous values of the current $I_1$ are lower at the switching times of this voltage bridge 19.

The exemplary embodiments of a DC-to-DC converter 1 and the method according to the invention described in FIGS. 1 to 5 can be modified in various ways to produce other exemplary embodiments. For example, the DC-to-DC converter 1 can have one of three different numbers of AC voltage phases. In particular, it can also be of single-phase design. In the single-phase case, the DC-to-DC converter 1 has, for example, a primary-side voltage bridge 11 and a secondary-side voltage bridge 19, each of which is designed as a full bridge. In addition, in the case of a multi-phase DC-to-DC converter 1, instead of detecting all the primary AC voltage phases $U_{P1}$, $U_{P2}$, $U_{P3}$, secondary AC voltage phases $U_{S1}$, $U_{S2}$, $U_{S3}$ and currents $I_1$, $I_2$, $I_3$ and averaging phase shifts, it can be provided that only the phase shift between one of the primary AC voltage phases $U_{P1}$, $U_{P2}$, $U_{P3}$ and the current $I_1$, $I_2$, $I_3$ of the corresponding series resonant circuit 9 is detected and controlled to zero if the ratio $U_{out}/U_{in}$ is greater than the transformation ratio n, or the phase shift between one of the secondary AC voltage phases $U_{S1}$, $U_{S2}$, $U_{S3}$ and the current $I_1$, $I_2$, $I_3$ of the corresponding series resonant circuit 9 is detected and controlled to zero if the ratio $U_{out}/U_{in}$ is less than the transformation ratio n. Moreover, in the case of a multi-phase DC-to-DC converter 1, it can be provided that the transformer unit 5 has a transformer for each AC voltage phase instead of a multi-phase transformer. In addition, digital phase detectors 43, 44 can be provided instead of analog devices. It can also be provided that the control unit 29 is designed to control the DC output voltage $U_{out}$ to a voltage setpoint value by changing a phase shift between the primary AC voltage and the secondary AC voltage instead of controlling the transmitted power P to a power setpoint value $P_S$.

Although the invention has been illustrated and described in detail by preferred exemplary embodiments, the invention is not limited by the examples disclosed and other variations will be apparent to persons skilled in the art without departing from the scope of protection sought.

What is claimed is:

1. A method of operating a DC-to-DC converter having a dual active bridge topology, comprising:
    generating a multi-phase primary AC voltage from a DC input voltage,
    transforming the multi-phase primary AC voltage into a multi-phase secondary AC voltage with a transformation ratio;
    generating a DC output voltage from the multi-phase secondary AC voltage;
    when a ratio of the DC output voltage to the DC input voltage is greater than the transformation ratio, determining an average value of phase shifts between an AC voltage phase of the multi-phase primary AC voltage and a respective current flowing through a series resonant circuit of that AC voltage phase; and controlling to zero the average value by changing a clock frequency clocking the AC voltages based on the determined average value; and
    when the ratio of the DC output voltage to the DC input voltage is less than the transformation ratio, determining an average value of phase shifts between an AC voltage phase of the multi-phase secondary AC voltage and a respective current flowing through a series resonant circuit of that AC voltage phase, and controlling to zero the average value by changing a clock frequency clocking the AC voltages based on the determined average value.

2. The method of claim 1, further comprising either controlling a power transmitted by the DC-to-DC converter to a power setpoint value or controlling the DC output voltage to a voltage setpoint value by changing a phase shift between the primary AC voltage and the secondary AC voltage.

3. A DC-to-DC converter, comprising:
for each primary AC voltage phase, a primary-side voltage bridge having a plurality of semiconductor switches generating a primary multi-phase AC voltage from a DC input voltage;
a transformer unit transforming the multi-phase primary AC voltage into a multi-phase secondary AC voltage with a transformation ratio;
for each secondary AC voltage phase of the multi-phase secondary AC voltage, a secondary-side voltage bridge having a plurality of semiconductor switches generating from the multi-phase secondary AC voltage a DC output voltage;
a series resonant circuit for each AC voltage phase;
a measuring device arrangement measuring the DC input voltage, the DC output voltage and variations over time of the primary AC voltage phases, the corresponding secondary AC voltage phases, and currents flowing through the series resonant circuits of these phases; and
a control unit which is configured to:
when a ratio of the DC output voltage to the DC input voltage is greater than the transformation ratio, determine an average value of phase shifts between an AC voltage phase of the multi-phase primary AC voltage and a respective current flowing through the series resonant circuit of that AC voltage phase, and control to zero the average value by changing a clock frequency clocking the AC voltages based on the determined average value, and
when the ratio of the DC output voltage to the DC input voltage is less than the transformation ratio, determine an average value of phase shifts between an AC voltage phase of the multi-phase secondary AC voltage and a respective current flowing through the series resonant circuit of that AC voltage phase, and control to zero the average value by changing a clock frequency clocking the AC voltages based on the determined average value.

4. The DC-to-DC voltage converter of claim 3, wherein each primary-side voltage bridge is constructed as a half-bridge having bridge arms comprising a semiconductor switch and a bridge branch connected to a primary winding of the transformer unit, and wherein each secondary-side voltage bridge is constructed as a half-bridge having bridge arms comprising a semiconductor switch and a bridge branch connected to a secondary winding of the transformer unit.

5. The DC-to-DC voltage converter of claim 3, wherein the transformer unit is constructed as a multi-phase transformer.

6. The DC-to-DC voltage converter of claim 3, wherein the transformer unit comprises a separate transformer for each AC voltage phase.

7. The DC-to-DC converter of claim 3, wherein the control unit comprises a first phase detector detecting a phase shift between a primary AC voltage phase and the current flowing through the series resonant circuit of that AC voltage phase, and a second phase detector detecting a phase shift between a secondary AC voltage phase and the current flowing through the series resonant circuit of that AC voltage phase.

8. The DC-to-DC converter of claim 3, wherein the control unit is configured to either control to a power setpoint value a power transmitted by the DC-to-DC converter or to control to a voltage setpoint value the DC output voltage by changing a phase shift between the primary AC voltage and the secondary AC voltage.

9. The DC-to-DC converter of claim 3, wherein each series resonant circuit is disposed either on the secondary side or on the primary side of the transformer unit, or components of each series resonant circuit are distributed between a secondary side and a primary side of the transformer unit.

* * * * *